(12) United States Patent
Berthold

(10) Patent No.: US 7,335,308 B2
(45) Date of Patent: Feb. 26, 2008

(54) METHOD FOR TREATMENT OF LIQUIDS, IN PARTICULAR, FOR PURIFICATION OF CONTAMINATED WATER

(76) Inventor: Hermann Berthold, 91325 Adelsdorf, ReichenbergerstraBe 6, Adelsdorf (DE)

( * ) Notice: Subject to any disclaimer, the term of this patent is extended or adjusted under 35 U.S.C. 154(b) by 32 days.

(21) Appl. No.: 10/909,759

(22) Filed: Jul. 29, 2004

(65) Prior Publication Data
US 2005/0150843 A1    Jul. 14, 2005

Related U.S. Application Data

(63) Continuation of application No. PCT/DE02/02748, filed on Jul. 26, 2002.

(51) Int. Cl.
*C02F 1/46* (2006.01)
*C02F 1/72* (2006.01)

(52) U.S. Cl. .............. 210/704; 210/718; 210/721; 210/748; 210/750; 210/758; 210/803; 210/806

(58) Field of Classification Search ............ 210/704, 210/705, 712, 718, 721, 724, 748, 750, 758, 210/765, 803, 806
See application file for complete search history.

(56) References Cited

U.S. PATENT DOCUMENTS 4,802,991 A * 2/1989 Miller ................. 210/705
5,545,330 A   8/1996 Ehrlich ................ 210/703
5,562,822 A  10/1996 Furness, Jr. et al. ....... 210/188
6,214,233 B1  4/2001 Lewis, III .............. 210/662

FOREIGN PATENT DOCUMENTS

| DE | 39 20 321 | 1/1991 |
| DE | 41 04 094 | 8/1992 |
| DE | 42 38 289 | 5/1994 |
| DE | 198 21 973 | 11/1999 |

OTHER PUBLICATIONS

English language translation of DE 198 21 973 A1.*

* cited by examiner

*Primary Examiner*—Matthew O. Savage
(74) *Attorney, Agent, or Firm*—The Webb Law Firm

(57) ABSTRACT

The invention relates to a method and an installation for treating liquids, especially for purifying contaminated water. Said method consists of the following steps: the raw water is pre-purified by adding a foam-forming reaction agent; the pre-purified water undergoes a main purification process by foaming the water with ionising radicals contained in the exhaust from the subsequent steps, in a known perforated cylinder washer, the foam formed is eliminated; the de-foamed water is ionised; and the impurities in the purified water are sedimented. The purified water is then additionally purified, the mud consisting of impurities from the pre-purification and the main purification process is physically separated, and the transformation of raw water into purified water is carried out continuously.

1 Claim, 2 Drawing Sheets

Figure 1:
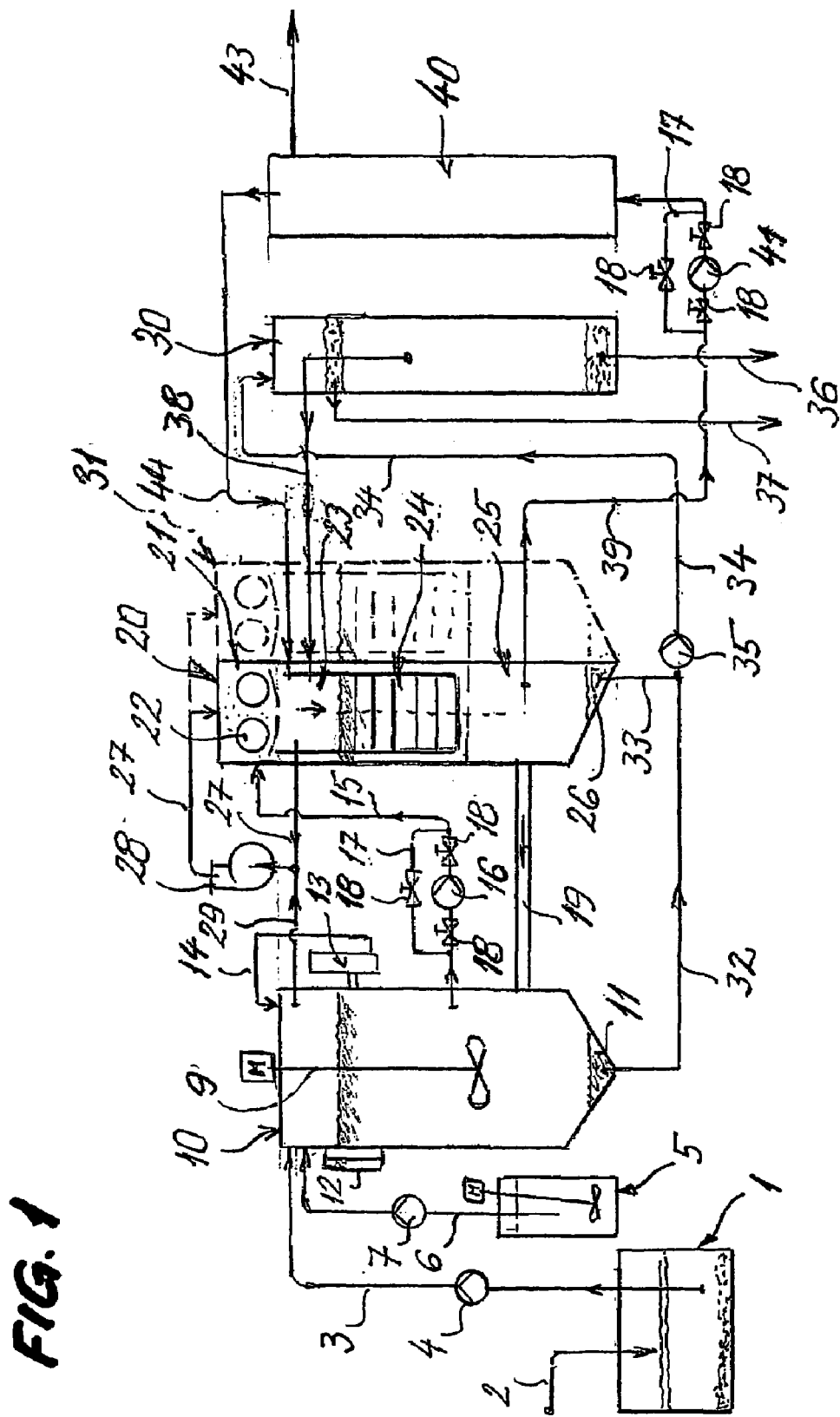

METHOD FOR TREATMENT OF LIQUIDS, IN PARTICULAR, FOR PURIFICATION OF CONTAMINATED WATER

This is a continuation of PCT application PCT/DE02/02748, filed Jul. 26, 2002, designating the United States, which claims priority from DE101 36 084.3, filed Jul. 26, 2001, the disclosures of which are incorporated herein by reference.

The invention relates to a method and a device for treatment of liquids, in particular for purification of contaminated water, as used for purification of highly contaminated waste water, in particular containing tensides, from vehicle washing installations for example.

U.S. Pat. No. 5,545,330 A discloses a system and a method for treatment of water in which the contaminated water is separated from the oil, aerated and then passed through a solids filter, an air stripper, ozonising devices, active carbon filters and finally a chlorinator—in all a highly complex installation since compressed air and heated compressed air and ozone are also required here and the contaminated exhaust air from the air stripper and the ozonisers is discharged into a combustion device. Recycling of the contaminants is non-existent or very limited and also cannot be carried out continuously.

A device for treatment of contaminated liquids is also disclosed in U.S. Pat. No. 5,562,822 A. Here, the water is first passed through a compressed air stripper, then through an active carbon filter, an ozonising device and a UV filter. The liquid to be purified is passed through this circuit—comprising the stripper, ozoniser, UV filter—a number of times until it is found to be sufficiently pure and discharged from the system. Only then is more raw water introduced into the purification circuit. Thus, this is a discontinuous purification process which is also not suitable for highly contaminated water containing tensides.

In addition, U.S. Pat. No. 6,214,233 B1 discloses a method and a device for treatment of waste water in which the raw water is first introduced into a working tank in which oxygenation takes place with the aid of compressed air and the pH value is adjusted, after which the prepurified water is passed through two active carbon filters connected one after the other and then discharged as pure water into a corresponding container. The device can be operated continuously with the pure water discharged continuously, or discontinuously with the pure water fed back into the working tank again to repeat the circuit through the two filters. Contaminants can only be extracted to a limited degree, and no disinfection takes place.

DE 42 38 289 A1 discloses a method for treatment of process waste water in which the waste water coming from a gas scrubber is passed first through an acid gas stripper, then through two oxidation devices and finally through an ammonia stripper, after which only one further treatment is possible. Thus, here again, there are a number of units which are arranged next to one another, and the waste gases from each are fed to a combustion chamber for burning off or sent for a further use.

DE 198 21 973 A1 describes a method and a device for treatment of water in which the raw water is stripped, the prepurified water is ozonised and ionised, then subjected to physical after purification and finally leaves the device as pure water. The gases stripped out are purified in a drum scrubber using a foaming reagent, before being reintroduced into the prepurification stripper. The reagent laden with the contaminants of the gas is subjected to gravity separation and fed to the drum scrubber again. Thus, here there are a closed reagent circuit and a closed gas circuit whereas the water is passed continuously through the device.

Thus, here the process and the equipment are complex, but here as well water highly contaminated with tensides cannot be purified satisfactorily.

Lastly, DE 41 04 094 A1 describes a device for purifying waste water, in particular of liquid pig manure, in which the solid components are separated by a centrifuge and the waste water is subjected to ozonising and electrolysis without chemical additives and then fed to a biological purification installation. This device is not suitable for waste waters containing tensides, as produced by washing installations for example.

Thus, the object of the invention is to disclose a method of the kind described above and a device for implementation of this method, through which waste waters highly contaminated with tensides can be optimally purified in an economical manner.

Accordingly, a method is provided in which for treatment of liquids, in particular for purification of contaminated water, the contaminated water (raw water) is prepurified with the admixture of a foaming reagent,
the prepurified raw water is subjected to a main purification procedure by
  foaming the water containing the reagent together with process gas containing ionisation radicals from the following main purification stage, during which the contaminants react with the airborne oxygen and the radicals,
  defoaming the foam produced in the scrubber, ionising the liquid coming from the defoaming,
  collecting the purified liquid and allowing the contaminant sludge to settle, after which
the purified water is subjected to physical afterpurification in a filter so that the pure water obtained after this can be sent for an appropriate use, while
the sludge produced by the prepurification and main purification is extracted and sent for physical separation, after which the substances separated by gravity are sent for appropriate use or treatment or recovery.

Therefore, the invention provides for contaminated, so-called raw water produced for example by vehicle washing installations, petrol stations and various washing processes or manufacturing processes, after advantageously being collected first in a raw water container, in which any oil or sinking substances such as sand contained therein are separated, to be subjected to prepurification in which the raw material is mixed with a reagent, producing a so-called preparation through which certain chemical and physical reactions take place.

It is advantageous if at the same time the pH value is adjusted to an average value of pH 7. Here, advantageously, the liquid is continuously or periodically kept in motion at least in part by an agitator in order to obtain optimum mixing and thus reaction of the raw water with the reagent.

The prepurification is followed by a complex main purification operation which consists in introducing the prepurified water containing reagent into a drum device known from DE 39 20 321 C2, for example. Generally, the method of purification disclosed therein provides for an intensive contact of the gases to be purified with the purification liquid. Such purification is obtained due to the varying cross-sectional areas of the reaction chamber in which a pulsation flow is created, causing a turbulence flow, as the surface of the outer pipe or pipes in motion is wetted by the purification liquid. This results in an especially high filtration effect because the resultant bubbles create a large filtration surface. Moreover, not only singular bubbles are formed, but such resultant bubbles may include several smaller bubbles. In other words, gas enriched with radicals from the defoaming and ionisation stages of the drum device is introduced and the water is foamed with the gas, during which chemical reactions take place between the contaminants and the airborne oxygen and the radicals. Each of the small foam bubbles forms its own miniature reactor in which in particular the contaminants consisting of organic carbon compounds oxidise. Thus, organic compounds become inorganic compounds which can be separated from the foam water. The continuously reforming reactive foam mass then sinks into the defoaming stage. During the following defoaming, the foam is broken up in a manner known per se through the action of the blower extracting the gas and the action of the radicals rising out of the ionisation stage which reduce the surface tension of the foam bubbles so that these burst. Thus, there is no longer any need for a special foam breaking device. The purified air released during defoaming is then discharged together with the radicals from the ionisation. The air discharged from the preliminary scrubber and the air from the main purification are then fed to the drum foaming device again so that a closed gas circuit is formed.

The water released from the foam is purified physically by means of gravity, i.e. filtered, after which the pure water obtained is sent for an appropriate use.

Advantageously, a large part of the pure water discharged from the filter can be returned to the main purification operation so that it passes through the ionisation again, through which the purification effect is substantially increased again. This can be carried out with a high rate of exchange. For example, 5,000 litres of the 30,000 litres of filtered pure water can be discharged as usable water while the remaining 25,000 litres are returned and run through the oxidation stage again. Consequently, pure water is continuously added to the purification process for support, so that a closed pure water circuit is present.

In addition, the sludge from the prepurification and from the main purification is extracted in a manner known per se and subjected to physical separation during which the light and heavy phases obtained during the separation process are removed and recycled or used in some other way.

It is of particular advantage that during the main purification operation on the prepurified water the drum reaction foaming, the defoaming, the ionisation and the collection of the purified water and the sludge take place in a vertical direction under gravity in the same unit. Thus, everything is carried out economically and in an overall energy and space-saving manner in a single housing.

It is also advantageous if the water recovered by the physical gravity separation is fed to the main purification stage again so that it runs through the ionisation, through which this water is also subjected to corresponding purification again.

It is of quite special advantage if purified water from the main purification is returned to the prepurification stage and returned at the same rate as prepurified liquid is pumped away into the main purification stage and raw water and purification agent are introduced into the prepurification stage. Thus, a closed raw water circuit is created here with a high rate of exchange, i.e. high recirculation rate.

In addition to the open continuous water purification process (raw water to pure water), two more closed water circuits are present, a first raw water circuit between the prepurification and main purification stages and a second pure water circuit between the main purification and afterpurification stages. It should be recognised that particularly efficient purification takes place through the resulting attainable rates of exchange or multiple high rates of exchange.

It can also be of particular advantage to simply omit the prepurification provided between the raw water container and the main purification stage and to mix the purification agent, preferably a liquid foaming reagent and a solid powdered reagent, to the water in the main purification stage and to connect this to the raw water container through an overflow and pressure equalising system. As a result, water enriched with reagent passes into the raw water container and the raw water contained there is subjected to prepurification by the reagents. The sludge produced in the process can be pumped out if necessary. This makes the device much simpler since a complete module with correspondingly complex inlet and outlet lines is eliminated.

With these "compressed variants", water is continuously extracted from the physical separating stage at the top and returned to the main purification stage, whereas at the bottom the sludge forming the sediment is collected in a replaceable container. A full replaceable container can then be removed easily and simply, replaced by an empty container and simply and neatly removed for recycling. At the same time, water is removed from the lower part of the separation stage and fed to the main purification stage, through which a part of the reagent can be used again in the purification process. This operation can be carried out discontinuously, controlled by a valve.

Reagent can also be returned advantageously if substances and reagent held back by the filters in the water afterpurification stage are fed to the separating stage again from where water and reagent are returned to the main purification stage and the sinking substances are discharged. Obviously, pure water from the afterpurification stage can also be returned directly to the main purification stage at the same time here, forming the pure water circuit, as already described above.

The device according to the invention for implementing the method described above is essentially composed of:
  a prepurification tank into which raw water and foaming reagent are introduced and preferably mixed by means of an agitator and in which advantageously the pH value is adjusted and the water level displayed,
  at least one tower-shaped main purification block which is composed of vertically stacked drum stations, defoaming station and ionisation station, and a collecting tank for the purified water and the contaminants settling in these, with just one common collecting tank when a plurality of main purification blocks are present,
  a separating device into which sludge discharged from the sump of the contaminant and main purification tank is introduced,
  at least one afterpurification device for the purified water discharged from the main purification block.

It should be recognised that the device according to the invention is of extremely compact design and that steps formerly carried out in devices arranged next to one another are now combined in a single block with stations arranged one under the other in a single common housing. Transport between these combined stations is effected automatically using gravity so that various inlet and outlet lines and pumps, valves etc are eliminated, and in addition energy is saved.

It is advantageous if the prepurification tank is preceded by a raw water collecting tank in which various sinking substances such as sand settle and light substances such as oil can be separated and skimmed off. This makes the following prepurification easier.

It is also advantageous if in addition to the line with the pump through which prepurified water is introduced at the top of the main purification block, an open return line is provided between the collecting tank of the main purification block and the working tank so that purified water from the purification operation flows through the return line into the prepurification tank automatically in line with the law governing communicating vessels at the same rate as prepurified water is pumped out. This produces a closed circuit which can be operated with high rates of exchange, i.e. with large volumes and large numbers of passes, so that for example relatively tiny amounts of raw water can be added to the volume of liquid being circulated and purified water can be discharged. This system also represents a system which is highly adaptable to need since different quantities of raw water can be introduced and pure water removed again and large quantities of water can be kept in circulation in the system.

It is also advantageous if the water clarified in the gravity separating device is fed to the main purification block above the ionisation station so that this passes through the ionisation stage again and at least partly passes into the closed water circuits. At the same time, the separated light substances are discharged through corresponding lines and sent for example for recovery of the substances contained therein or combustion in corresponding heating installations.

It is particularly advantageous that the defoaming station of the main purification block is connected to the drum station through a gas return line with a blower so that a closed gas circuit is formed so that the gases released during defoaming and collecting in the defoaming station and the radicals produced by ionisation are discharged together and fed to the drum foaming station where they are then used for foaming and chemical conversion of the contaminants in the water, after which the foam flows into the defoaming station, the gas is released again, and so on. Here, a gas supply line leading away from the top of the prepurification tank can advantageously be connected to the gas return line of the main purification block so that the blower of the return line can be used simultaneously to extract air from the prepurification tank and introduce it into the circuit so that it is purified at the same time.

It is also particularly advantageous if a return line is provided between the outlet of the filter device and the main purification block, through which the pure water from the filter is introduced above the ionisation station, after which this runs through the ionisation again and together with further purified water is conveyed through a supply line with a pump to the filter device and passed through this.

An extremely advantageous and even more compact form of embodiment of the device is obtained if the prepurification container between the raw water container and the main purification block is eliminated completely and the liquid or powdered solid reagent is introduced into the main purification container directly and mixed with the water in it by an agitator provided in the latter. This does not eliminate the prepurification but this now takes place in the raw water container into which excess process water flows through an overflow and pressure equalising line. The reagent substances introduced with it carry out prepurification of the raw water in that they kill off bacteria and germs for example. In this form of embodiment the drum stations of the main purification blocks preferably only exhibit one drum which is fed firstly with air extracted from the top of the ionisation stage and secondly with water mixed with reagent from the bottom of the main purification container and from which the air expelled by the drum is fed back into the container, improving the flow ratio and the reaction of the airborne oxygen with the O+H radicals produced by the oxidation unit. A further advantage achieved through this is that the air circuit now remains closed, so that toxic substances initially contained in the raw water for example cannot be emitted.

In the compact variant, the main purification blocks are preferably no longer necessarily arranged one next to the other over a common collecting container, but one or more main purification blocks are now arranged uniformly on the internal circumference or in a star arrangement in a common main purification container which can be round or cylindrical or polygonal, forming a compact closed main purification unit with a central agitator.

In this form of embodiment, the lines returning from the separating device and the after purification device to form a circuit are arranged slightly differently. Now, not just one but two lines lead back from the separating device to the main unit, firstly a line which can be opened if required and connects the bottoms of the two units, and secondly a return line which connects the upper ends and works like an overflow which feeds the surplus water back into the main purification container. At the same time, a return line runs from the bottom of the after purification device to the top of the separating device so that pure water with substances held back by means of the filters, e.g. sinking substances and reagent, is introduced into the separating device and thus returned to the circuit. This is also controlled by means of a corresponding control valve.

Figure 2:
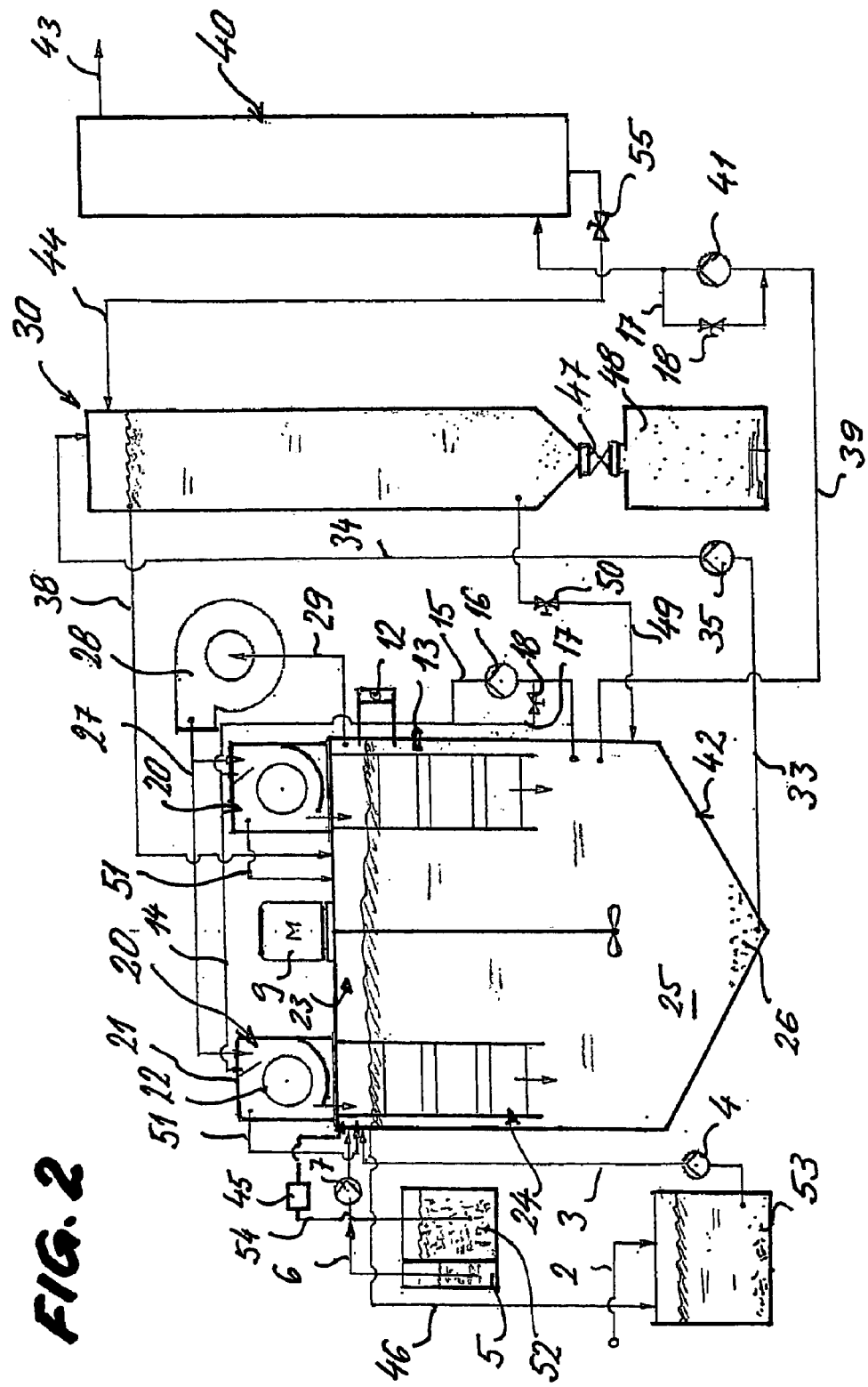

In the following the invention is explained in greater detail on the basis of two embodiment examples of the device according to the invention with reference to the drawing in which:

FIG. 1 shows a diagrammatic side view of the device in a first embodiment, and FIG. 2 shows a diagrammatic side view of the device in a second compact embodiment.

As can be seen from FIG. 1, raw water in the form of waste water from a vehicle washing installation for example is introduced into a raw water container 1 through a supply line 2. Initial separation of substances insoluble in water, in particular sinking substances such as sand, and light substances such as oil, is effected in this raw water container 1.

From the raw water container 1, the raw water is then passed through a line 3 with a pump 4 to a prepurification tank 10 continuously or discontinuously according to need. At the same time, a foaming reagent is conveyed, again continuously or discontinuously, from a container 5 through a line 6 with a pump 7 to the prepurification tank 10 in which the raw water is mixed with the reagent by an agitating device 9 which also works continuously or discontinuously. In the process, components of the reagent react with contaminants in the raw water and the insoluble substances formed sink as contaminant sludge to the sump 11 at the bottom of the prepurification tank 10. In addition, a water level indicator 12 known per se is also provided, by means of which a corresponding level control can be monitored. In addition, a pH value regulating device 13 is also provided on the prepurification tank 10, by means of which the pH value of pH 7 for example set by the addition and/or design of the reagent is monitored. In the event of fluctuations outside predetermined tolerance limits, a corresponding basic or acid additive is introduced into the prepurification tank through a line 14.

From the prepurification tank 10 the prepurified raw water is then conveyed with the aid of a line 15 with a pump 16 into a drum station 21 at the upper end of at least one main purification block 20. Here, the supply pump 16 is provided with a bypass 17 and in conjunction with the latter with valves 18 in the bypass and in the inlet and outlet lines of the pump so that the quantity of water introduced into the drum station 21 can be influenced easily by means of the bypass.

The main purification block 20 exhibits a plurality of stations arranged vertically one directly under another, namely the drum station 21 mentioned previously in which the reactive foaming described in greater detail further on is carried out, and under this the defoaming station in which the foam is broken up into gas and liquid, and under this in turn an ionisation station 24 through which the liquid runs vertically downwards and in which the substances contained in it are ionised. This is followed by a collecting tank 25 for the purified water, and the insoluble contaminants contained in the latter move on down and settle in a sump 26 of the collecting tank.

From the defoaming station 23, the gas released by the defoaming process together with the radicals released by the ionisation are introduced through a line 27 with a blower 28 into the drum station 21. Now, in a manner known per se and mentioned previously, the liquid introduced by the line 15 from the prepurification tank is foamed together with the gases introduced through the line 27 by the dynamic drums 22, and at the same time the chemical reactions described previously take place, triggered by the reagent and the gaseous radicals. In the process, the organic carbon compounds contained in the water are oxidised and form insoluble inorganic compounds which then finally are precipitated from the water and deposited as sludge in the sump 26. However, first, the reactive foam produced in the drum unit 21 travels one stage lower into the defoaming station 23 where it is exposed to the suction of the blower 28. As a result of this and the radicals which rise from the ionisation station located below it and reduce the surface tension of the foam bubbles, the foam bubbles burst, the foam is broken up in the process and the gases released are extracted with the aid of the blower 28 through the line 27 and forced into the drum station 21 again. It should be recognised that here a closed gas circuit is in operation in which the gases released during the prepurification are also extracted from the prepurification tank 10 with the aid of the blower 28 solely through a line 29 and introduced through the line 27 into the drum station where this exhaust air from the prepurification stage is also purified in the foaming phase.

From the collecting tank 25 of the main purification block 20, a relatively wide open return line 19 runs into the prepurification tank 10, through which purified water from the collecting tank 25 flows into the prepurification tank 10 at the same rate as the quantity of prepurified liquid discharged through the line 15 with the pump 16, obviously also taking account of the further liquids introduced or liquids introduced into and removed from the prepurification tank and the main purification block 20. Thanks to the high delivery volume of the pump 16, a relatively large volume of liquid is kept continuously in circulation in the water circuit so-formed, referred to hereinafter as the raw water circuit. This circuit, i.e. its rate of exchange, can be influenced by the bypass 17 with the valves 18 through which for example a significant part of the volume of liquid delivered by the pump 16 can be returned in the circuit to the pump. As a result of this, the quantity of liquid finally delivered through the line 15 to the drum units 21 is essentially adjustable so that the sinking speed in the main purification process can also be influenced by this overall. A broken line 31 shows that the main purification block 20 can be extended if necessary, with a plurality of working columns, here two working columns by way of indication, each consisting of a drum station, a defoaming station and an ionisation station, possibly arranged next to one another on a common collecting tank 25, forming a main purification unit 20' altogether. Obviously, then the supply lines 27 and 28 for liquid and gas exhibit the required number of appropriate connections.

The sludge produced in each case is extracted from the sump 11 of the prepurification tank 10 and the sump 26 of the main purification block 20 by means of lines 32 and 33 and a supply pump 35 and a common further line 34 and introduced into a separating device 30 from above. In the latter the sludge is separated by gravity in a manner known per se in that the heavier fractions accumulate on the bottom of the device whereas the light fractions collect on the clarifying liquid. The substances to be separated can then be discharged by means of lines 36 and 37 and sent for various uses.

The water clarified in the separating device by gravity separation is introduced into the main purification block above the ionising station through a line 38 so that this water runs through the ionisation and undergoes further purification.

Purified water from the collecting tank 25 is also conveyed into or passed through an afterpurification device 40, which can be a filter known per se, through a line 39, after which filtered pure water is sent through an outlet line 43 for further uses. This delivery pump 41 also has associated with it a bypass 17 and valves 18 through which the delivery of the pump 41, i.e. the quantity of liquid conveyed from the collecting tank to the filter, can be adjusted easily as necessary.

From the after purification device 40 a line 44 leads back into the main purification block 20, again above the ionisation device 24, through which this water is subjected to ionisation again. The overall result is a closed pure water circuit through which the water can circulate a plurality of times, in each case running through the ionisation station and the filter a number of times, so that then explainably optimally purified water leaves the device through the line 43.

In the case of the embodiment example of the compact device illustrated in FIG. 2, the raw water also passes through a supply line 2 into a raw water container 1 in order to be transferred from the latter with the aid of a pump through a supply line 3 into the main purification container 42 of the main purification unit 20'. Here, the reagents are introduced directly into the container 42, namely in the form of a liquid reagent from a container 5 by means of the line 6 and the pump 7, while a reagent in the form of a dry powder mixture is introduced from a container 52 by means of a line 54 with a metering device 45 to top up when the raw water composition changes. In the centre of the container 42 there is the agitator 9 which mixes the raw water introduced with the reagents and previously purified water, through which the reaction mechanisms run continuously and more effectively compared with the variant according to FIG. 1.

In the main purification container 42 there are a plurality of main purification blocks 20 which are essentially of the same design as those in FIG. 1, only here the drum stations 21 only exhibit one perforated drum 22. A supply line 15 conveys the water mixed with reagent from a lower zone of the container 42 by means of a pump 16 and introduces it into the drum stations 21 where the foaming etc takes place, as described in FIG. 1. For this, the released gas from the defoaming station 24 together with the radicals released by the ionisation are introduced into the drum station 21 by means of the line 27 and the blower 28. The gases thrown out by means of the drums 22 during the foaming operation and rising out of the defoaming station are fed back into the container 42 level with the defoaming station 23 through a return line 51. It can be seen that a closed air circuit is present.

Here as well, the sludge produced is extracted from the sump 26 of the main purification container 42 by means of a line 33 and a delivery pump 35 and introduced from above into a separating device 30 where gravity separation of the sludge takes place. At the bottom of the separating device 30 there is also a replaceable container 48 which is connected to the device through a shut-off valve 47. The sinking substances settle in this container 48, after which the full container can be changed for an empty container and sent for recycling. Connected in the upper sector of the separating device 30 there is a return line 49 which leads to the lower zone of the main purification container 42 and by means of which a part of the reagent can be returned to the main purification process, controlled by means of a valve 50. At the same time, a line 38 in the upper zone of the separating device 30 conveys clarified water to the main purification blocks 20 above the ionisation stations 24 so that this water undergoes further purification.

In addition, a line 39 leads from the lower zone of the main purification container 42 to the afterpurification device 40, which contains a simple or cross-flow filter for example, and is discharged from the latter through an outlet line 43 in the form of filtered pure water. Here again, a bypass 17 with a valve 18 is provided in the line 39 with the delivery pump 41 in order to control the quantity delivered in optimum fashion. A return line 44 leads from the bottom of the afterpurification device 40 to the top of the separating device 30 and introduces filtered substances and reagents into the separating device. This discharge is controlled by means of a solenoid valve 55.

LIST OF REFERENCES

1. Raw water container
2. Inlet line
3. Supply line
4. Pump
5. Reagent container
6. Line
7. Pump
8. -
9. Agitator
10. Prepurification tank
11. Sump
12. Water level indicator
13. pH value controller
14. Line
15. Line (water supply)
16. Delivery pump
17. Bypass
18. Valves
19. Return line equalising line
20. Main purification block
20'. Main purification unit
21. Drum station
22. Perforated drum
23. Defoaming station
24. Oxidation unit
25. Collecting tank
26. Sump
27. Outlet line
28. Blower
29. Line
30. Separating device
31. Broken line
32. Sludge line
33. Sludge line
34. Sludge line
35. Delivery pump
36. Outlet line
37. Outlet line
38. Return line
39. Supply line
40. Afterpurification device
41. Pump
42. Main purification container
43. Pure water outlet line
44. Return line
45. Metering device
46. Overflow and pressure
47. Valve
48. Replaceable container
49. Return
50. Valve
51. Air return
52. Reagent container II
53. Reagent sediment
54. Line
55. Control valve

What is claimed is:

1. A method for treatment of liquids, including contaminated water containing contaminants, the method comprising the steps of:
   prepurifying the contaminated water by mixing a foaming reagent therewith to obtain prepurified water; and
   performing a main purification process using the prepurified water, the main purification process comprising the steps of:
      foaming the prepurified water together with ionization radicals within a perforated drum scrubber, whereby the contaminants are oxidized to produce sludge, wherein the ionization radicals are obtained from gas formed during the main purification process;
      defoaming the resultant foam to obtain defoamed water;
      ionizing the defoamed water to obtain purified water;
      causing the sludge to settle in the purified water;
      collecting the sludge and purified water in a same unit;
      applying physical afterpurification to the purified water; and
      removing the sludge, wherein the foaming, the defoaming, the oxidization, the ionization, and the sludge and purified water collection steps are performed in the same unit in a vertical sequence, one under the other, such that the resultant foam and liquid flows under the force of gravity during the main purification process.

* * * * *